No. 696,916. Patented Apr. 1, 1902.
E. F. MORSE.
APPARATUS FOR GAGING TEMPERATURES OF HEATED SUBSTANCES.
(Application filed Nov. 9, 1899.)
(No Model.) 2 Sheets—Sheet 1.
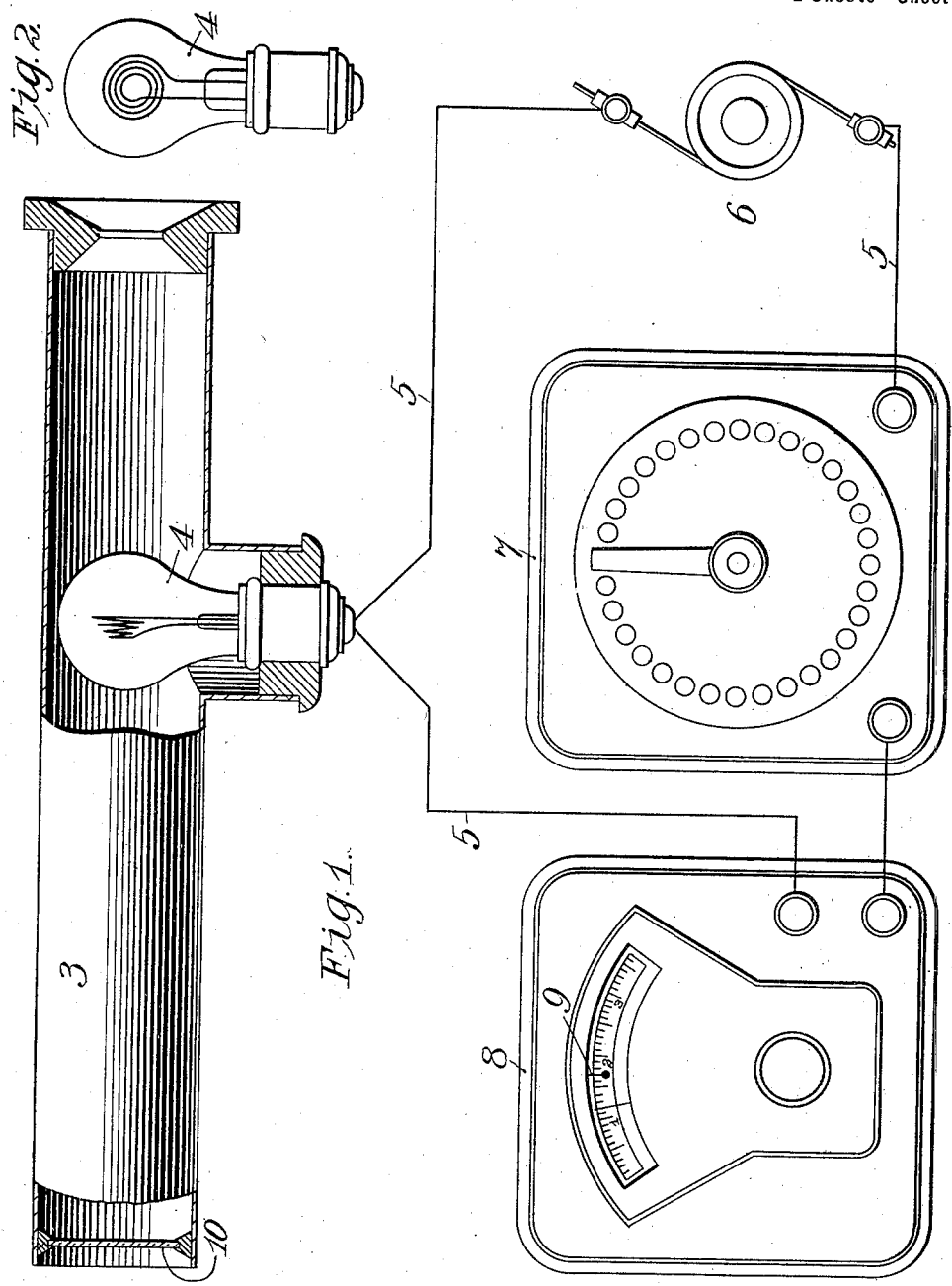
Witnesses:
C. L. Belcher
J. J. Carter
Inventor
Everett F. Morse
By
Townsend & Decker
Attorneys No. 696,916. Patented Apr. 1, 1902.
E. F. MORSE.
APPARATUS FOR GAGING TEMPERATURES OF HEATED SUBSTANCES.
(Application filed Nov. 9, 1899.)
(No Model.) 2 Sheets—Sheet 2.
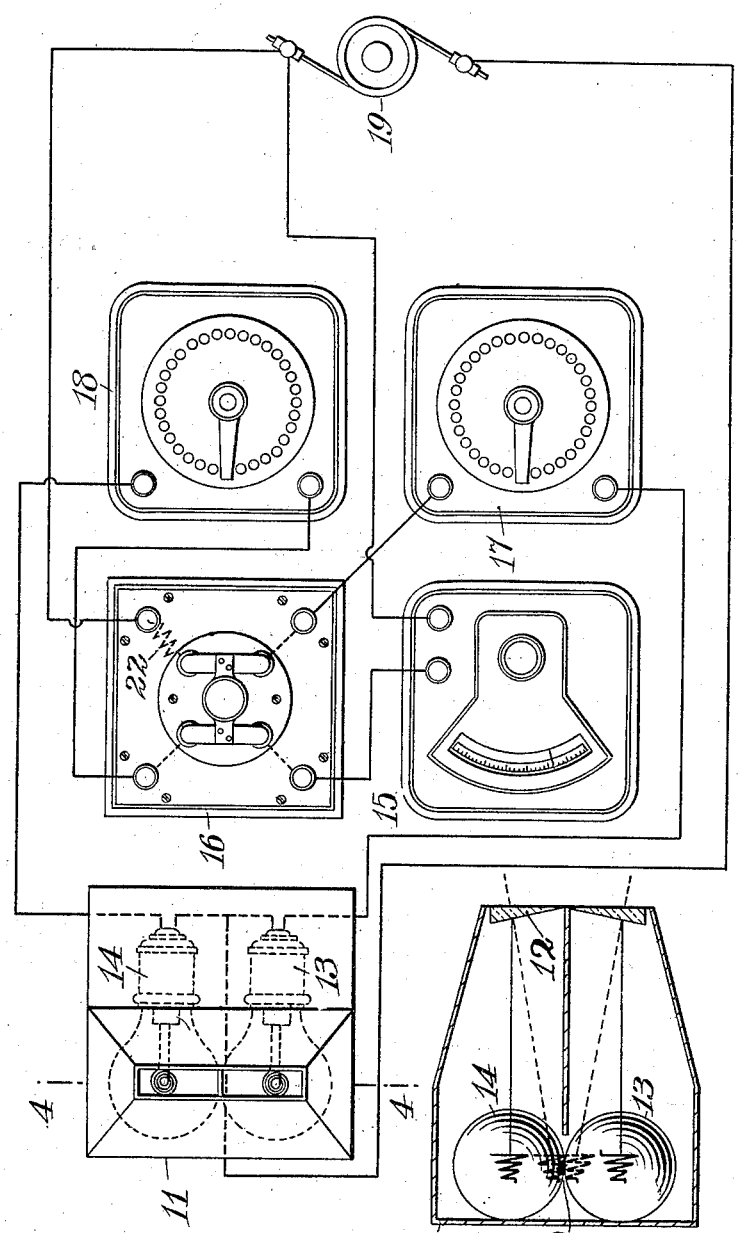

\# UNITED STATES PATENT OFFICE.

EVERETT F. MORSE, OF TRUMANSBURG, NEW YORK.

APPARATUS FOR GAGING TEMPERATURES OF HEATED SUBSTANCES.

SPECIFICATION forming part of Letters Patent No. 696,916, dated April 1, 1902.

Application filed November 9, 1899. Serial No. 736,363. (No model.)

*To all whom it may concern:*

Be it known that I, EVERETT F. MORSE, a citizen of the United States, and a resident of Trumansburg, in the county of Tompkins and State of New York, (whose post-office address is Trumansburg, New York,) have invented certain new and useful Apparatus for Gaging Temperatures of Heated Substances, of which the following is a specification.

This invention relates to apparatus for carrying into effect a novel method for gaging the temperature of a heating or heated substance which becomes luminous or incandescent when heated.

The object of the invention is to provide for accurately determining the critical degree of temperature to which it is necessary to heat steel, for example, in order to produce the best possible results in hardening or in annealing it, and just as important as the above is its object of enabling a workman to reproduce in every succeeding piece of steel the same result. This is of great importance in manufactories where it is necessary for economical and other reasons to produce in tools, parts of machines, and other devices uniformity in hardness, malleability, or ductility.

The apparatus heretofore employed for determining the temperature of heating or heated metals for hardening or annealing or other purposes have failed in securing uniformity of result and arriving even infrequently at the best result. Previous apparatus in optical pyrometry has been organized for the purpose of comparing the substance to be tested with an optical standard arranged at one side of the field of vision of said standard. With such an organization the observer has to carry mentally from one to the other the color effect of either the substance or standard. The accuracy of the test depends on the skill of the observer, and even with the best skill the effort necessarily exerted to make accurate comparisons by this method is very fatiguing, so much so that time for the eye to rest must be provided between observations. If in addition to thus carrying mentally the color sensation of the standard or substance from one to the other and comparing them the observer has to compensate or make allowance for different optical sensations due to a substantial difference in the size, or (to some extent) the shape, of the standard and substance, then the accuracy and reliability of the comparisons are greatly impaired.

In my improved apparatus the above difficulties are overcome by so organizing the same as to permit a comparison based on the fact that if two substances are made to produce in the eye the same color effects or sensations and one of them, or a portion thereof, is arranged in the path of the rays passing from the other to the eye the portion of the one so arranged or superposed will merge in the other and apparently be obliterated from view.

The material of which the standard is composed may be different from that of the metal tested, but must produce substantially the same sensation in the eye with respect to color. The merging effect above referred to is a well-defined phenomenon and enables the observer to easily and at once detect when the substance is at the desired temperature, for were the temperature either above or below the temperature indicated by the standard both would be visible and the difference in color would be sharply defined by the one appearing against the other, for the portion superposed would appear to be a part of the substance which lies beyond it and a part of whose rays it intercepts.

While my apparatus is particularly useful when the standard and substance to be tested differ much either in shape or size, it still has advantages no matter what the standard may be.

It is preferred to employ as a standard one which glows or is rendered incandescent by heat, since this affords a ready and convenient means of accurately varying the color or effect upon the eye of the standard. By preference I use a filament or piece of carbon or platinum heated by a passage of an electric current, since such substance will be substantially the same nature with respect to incandescence as those metals in testing whose temperature my apparatus is especially useful.

In carrying out my invention the apparatus is organized with the standard placed in the path of the rays of light passing to the eye from the thing to be tested or conversely with the thing to be tested, or a portion thereof in the path of rays of light passing to the eye from the standard, so that the outline of one or a portion thereof shall appear to overlap in whole or in part the field of the other, the existence of the same or of the desired comparative degree of temperature being then shown when the outline of the one or a superposed portion thereof disappears or becomes merged in the other.

By a standard of substantially the same nature in respect to incandescence as the thing being tested is meant one that when heated to the proper temperature produces upon the eye substantially the same color effects as said heated substance.

It is ordinarily preferred to employ with the standard an indicator showing directly or indirectly the degree of incandescence or temperature of the standard and to connect said indicator with a regulator by which its degree of incandescence or temperature can be raised or lowered, so as to correspond to any desired temperature within the range of this method of gaging temperatures.

By this apparatus the degree of incandescence corresponding to the critical degree of temperature for any substance is determined by trial and test and its attainment noted by the indicator, (voltmeter, ammeter, or rheostat,) so that the apparatus may at will be set for that particular degree of incandescence and other articles brought to the critical temperature by heating them until they correspond in incandescence with the standard.

By this invention it is possible for a person of ordinary ability to produce the same desired hardness, malleability, or ductility in every like article, because by it he can accurately determine when each article reaches the critical degree of temperature at which the best results can be produced.

With these objects in view the invention consists in the construction, combination, and arrangement of parts, substantially as hereinafter set forth and claimed.

In the accompanying drawings, which form a part of this specification, Figure 1 represents, partially in section, the apparatus with its circuits, embodying the invention. Fig. 2 is an elevation of the incandescent lamp seen in Fig. 1. Fig. 3 illustrates another embodiment of the invention; and Fig. 4 is a sectional view of a part of the apparatus seen in Fig. 3, the section being taken in the plane indicated by the line 4 4. Fig. 5 represents a batch of small articles being heated for observation.

The invention may be carried out in various ways, two of which are illustrated. In the apparatus shown at Figs. 1 and 2 there is an inspection-tube, as 3, which is open at both ends—that is, so that it may be looked through, though there may be a transparent diaphragm at either or both ends for the protection of the interior of the tube and its contents. In the outer end of the tube such a diaphragm is shown, as at 10. It may be of mica or glass. In the forward or eyepiece end of the tube no diaphragm is shown, though a piece of clear glass may be used there, if desired. There is located in the tube in any suitable manner an incandescing substance—such, for example, as a filament 4—which is most conveniently inclosed in a vacuous bulb and constitutes an incandescent lamp. The filament of this lamp may be of any suitable form. That shown is of spiral form, through the coils of which the substance to be heated may be viewed. This filament constitutes the standard of incandescence of my apparatus. It is included in an electric circuit 5, supplied from a source of current. (Indicated at 6.) There is a suitable rheostat in the circuit, as at 7, and a meter or indicator, as at 8. A marker may be employed in the indicator, as indicated at 9. This may be set at a predetermined point on the scale at which the index must stand when the apparatus is used for gaging the temperature of a certain batch or class of things to be hardened or annealed.

The apparatus may be used as follows: By trial may be found the particular color at which the requisite temperature of the metal is reached. The rheostat is then manipulated to produce the same color in the filament 4, and when it is produced the current or the position of the indicator may be noted and the marker 9 set. Then the next article to be hardened or annealed may be viewed through the tube 3, and when the temperature reaches the proper degree its color will be the same as that of the filament and the latter will be obliterated. This point is accurately and decisively determined, because the filament will show light against the heating metal before it reaches the critical temperature and dark against it should the temperature of the metal pass the critical point. In transit from one of these conditions to the other there is a time when the filament is lost to view. That is the critical moment, and at that instant the metal should be immersed in the hardening-bath. A batch of small pieces of metal being heated is illustrated in the crucible at 21. When accurate temperature readings are desired, both the object heated and the standard should be well screened or protected from light from other sources, so as to prevent them from reflecting any light, thus making them show a color that is caused solely by their own incandescence. In addition to the employment of this means for producing uniformity in hardening and annealing it serves as a gage in arriving at the temperature which is best suited to produce the desired effect in hardening or annealing any particular thing. If on trial it is found that a certain temperature is not quite high enough, a small amount of resistance may be cut out of the circuit 5, thereby slightly increasing the brilliancy of the filament. The position of the indicator is then noted and the thing heating is brought to that temperature which will make its degree of incancence identical with that of the filament. In this way repeated trials may be conducted with accuracy and the best results attained with certainty and despatch. Then when the best result has been attained the same degree of heat may thereafter be reproduced in any number of successive articles or things in which changes in degree of incandescence and color can be produced by changes in temperature. The different degrees of incandescence include a range from the faintest original luminosity due to heat to an incandescence of the brightest or whitest light.

By using a carefully and minutely graded and graduated rheostat and a current of constant voltage the indicator—an ammeter or voltmeter—may be dispensed with and the positions of the rheostat noted for the various degrees of incandescence in the filament. The electrical indicator may be calibrated and graduated to give readings in degrees of temperature, if desired.

Obviously more than one testing-tube, with its lamp, may be placed in the same circuit to accommodate several operations. In that case the lamps are preferably placed in parallel and every lamp is brought to the color of the dullest one by using with each of the brighter ones sufficient resistance to effect that purpose. The invention itself is well adapted for standardizing the several lamps as used and for standardizing lamps for use in the general application of the invention. This may be done as illustrated in Figs. 3 and 4. Therein the inspection-tube is shown at 11. It is preferably closed completely at its outer end and is provided with lenses or prisms 12 at its forward end, thus forming a binocular testing tube. In this tube is placed the standard lamp, which may be that represented at 13, and by its side is placed the lamp 14, the incandescence or temperature of whose filament is to be brought into exact accord with that of the filament in the standard lamp. At 15 is an indicator, preferably an ammeter, and at 16 is a reversing-switch provided with a resistance 22 equal to that of the ammeter. At 17 and 18 are rheostats, and at 19 is represented the source of current. At the outset the switch may be in the position shown, which places the lamp 13, the rheostat 17, and the resistance 22 of the switch in series in one circuit and the lamp 14, the rheostat 18, the switch, and the ammeter in series in the parallel circuit. Obviously another ammeter may be used in the place of the switch. The rheostat 17 may then be set at the proper position to bring the lamp 13 to the standard brilliancy. If desired, the ammeter may be employed to insure the proper point at which to fix the rheostat. That would be done by turning the switch through ninety degrees. Then when the lamp 13 is at the standard incandescence and the switch back in the position shown the incandescence of the lamp 14 may be gradually brought up to the standard by the manipulation of the rheostat 18. The operator determines its arrival at the standard brilliancy by comparing it with the standard lamp. To make this comparison accurate by this plan, the same as in the first plan described, the filament being tested is brought into the line of vision by which the standard is viewed, so that the observer need not take his eye from either the standard or the other filament in making the comparison. The desired superposition may be forced optically by the use of the prisms or lenses 12, the same as in a stereoscope, the images of the filaments being merged or made to overlap. This is indicated by the dotted lines at 20, Fig. 4. In this way both filaments are viewed at once, and by gradually moving the contact of the rheostat 18 the filament of lamp 14 is brought to the exact shade of color of the standard. Then the reading of the latter is taken, so that when the lamp is put to use the standard color can be readily produced. To verify the exact correspondence of the two lamps, the switch may be turned and the position of the ammeter noted. Any variation in color will be easily detected by thus quickly transposing the currents. The lamps also may be transposed to avoid any mistake because of a possible variation in the eyes of the observer. The lamps instead of being compared with each other might be compared with the heated substance, as in Fig. 1, and the current which would bring them to the same incandescence as this heated substance measured in each lamp. This arrangement of lamps, circuits, switch, and indicator enables the current passing through both lamps to be measured on the same ammeter, so that the readings are accurate—that is, this arrangement eliminates the difference there would be in using two ammeters and produces greater uniformity in the lamps which are thus standardized. Furthermore, should it be desirable to run two or more lamps at different colors from the same circuit for testing things to be hardened to different degrees we can obviously accomplish this by the use of the one ammeter and the reversing-switch, by means of which the current flowing through either lamp can be made to flow through the ammeter, while the current flowing through the other lamp passes through a resistance equal to that of the ammeter.

In the two ways described for using the invention the lamps 4 and 13 constitute alike the standard of incandescence, while the filament of the lamp 14, heated electrically, corresponds exactly to the article or batch of articles 21 which it is desired to heat by ordinary means of combustion to a certain temperature.

Other means than the filament shown may be employed as a standard of comparison, and such standard may be mounted in a different manner from those illustrated, and the color of the said standard may be changed by other means than by electricity without departing from the invention. However, as incandescing substance, especially a filamentary one in an electric circuit, has been found to give the best satisfaction, and though it operates best when shielded from extraneous influence, it may obviously be used with good effect without the shield or tube.

I wish it expressly understood that by the term "apparatus" as used in the description and claims I do not limit myself to the tube and the filament therein, but refer to the entire outfit, including circuits, rheostat, and indicator. It is immaterial whether or not the standard is located in a tube. It may be used in a dark room without a tube or any other support save the hand of the operator.

I do not hereby claim the method of gaging the temperature of the material, as herein set forth, by comparing the same when heated with an optical standard by placing the material and standard so that a portion, at least, of one is in the path of rays of light passing from the other to the eye and observing whether or not the one merges in the other, as this forms the subject of broad claims in my application filed August 4, 1899, Serial No. 720,101, nor do I claim this method when practiced by using a standard which is incandescent, as this also forms the subject of a broad method claimed in the said application.

What I claim as my invention is—

1. In an apparatus for gaging the temperature of substances which become incandescent when heated, the combination of the standard, means for supporting the same in line with the substance to be tested and the eye so that a portion at least of one may be superposed upon the field of the other, and means for bringing those portions thereof which are directly under the eye of the observer to practically the same appearance.

2. In an optical heat-gage apparatus, means for furnishing an optical standard of comparison with the substance to be heated and so located in the apparatus as to permit at least a portion of one to be seen superposed upon the field of the other.

3. In a heat-gage apparatus, an optical standard consisting of a substance that may be made incandescent and so located in the apparatus as to be in the path of the rays passing to the eye from the heated substance to be tested or gaged.

4. In an apparatus for gaging the temperature of a substance, a standard adapted to become incandescent to a degree corresponding to the incandescence of said substance when heated to the desired temperature, said standard being so located with respect to the line of vision through the apparatus as to permit a portion at least of one to be seen superposed upon the field of the other.

5. An optical heat-gage having an optical standard consisting of a substance whose degree or nature of incandescence is dependent upon the temperature to which it is heated and so located in the apparatus as to permit at least a part of its incandescence to be seen superposed upon the field of the incandescence of the heated substance to be tested or gaged.

6. The combination with two incandescent lamps 13 and 14, a rheostat and ammeter in the circuit of one lamp, a rheostat in the circuit of the other lamp, and a reversing-switch for transposing the circuits of the lamps substantially as and for the purpose set forth.

Signed at New York, in the county of New York and State of New York, this 28th day of October, A. D. 1899.

EVERETT F. MORSE.

Witnesses:
D. H. DECKER,
F. J. CASTEX.